UNITED STATES PATENT OFFICE 2,301,206

MANUFACTURE OF TERPHENYL DERIVATIVES

Harold France, Isidor Morris Heilbron, and Donald Holroyde Hey, London, England, assignors to Imperial Chemical Industries Limited, a corporation of Great Britain No Drawing. Application May 29, 1939, Serial No. 276,470. In Great Britain May 30, 1938

6 Claims. (Cl. 260—613)

This invention relates to the manufacture of p-terphenyl (1:4-diphenylbenzene) and certain of its derivatives.

According to the invention we make p-terphenyl and the derivatives by interacting either a dinitrosodiacyl-p-phenylene-diamine, which is unsubstituted, with at least 2 molecular proportions of benzene or of a di-substituted derivative of benzene in which the substituents are the same and occupy positions 1 and 4, or by interacting a nitrosoacyl-p-aminodiphenyl, which may carry substituents in either or both phenyl nuclei, with at least one molecular proportion of benzene or of a di-substituted derivative of benzene as mentioned above, the interaction being effected in either case in an excess of benzene or of the di-substituted benzene.

For general purposes, dinitrosodiacetyl-p-phenylene-diamine is the most suitable dinitrosodiacyl-p-phenylenediamine to use, because the acetyl compound is the most readily available of the acyl compounds. Similarly nitrosoacetyl-p-aminodiphenyls are the most suitable nitrosoacyl-p-aminodiphenyls to use. With either kind of compound however other acyl derivatives may be used, for instance formyl or propionyl derivatives, but preferably the derivatives should be simple ones.

p-Terphenyl and certain of the substituted p-terphenyl derivatives of this invention are known compounds, but the invention provides a process for their manufacture, which is more technically advantageous than the processes which have been previously described. For the substituted derivatives of p-terphenyl which are new compounds, this invention provides a technically useful process for manufacture.

p-Terphenyl and its derivatives which may be obtained by the above mentioned process are suitable starting materials for the manufacture of dyestuffs.

The following examples, in which parts are by weight, illustrate but do not limit the invention.

Example 1

A mixture of 11 parts of dinitrosodiacetyl-p-phenylenediamine (made as described below) and 260 parts of benzene is stirred at 35° C. for 12 hours. During this time the first mentioned compound passes into solution and nitrogen is evolved. At the end of the 12 hours the resulting liquid is distilled. When nearly all the excess benzene has been removed, the residue is subjected to sublimation or distillation under reduced pressure. p-Terphenyl M. P. 210° C. is obtained in good yield.

Dinitrosodiacetyl-p-phenylenediamine, which is a new compound, is made as follows: 10 parts of diacetyl-p-phenylenediamine (made by acetylating p-aminoacetanilide) is warmed with a mixture of 210 parts of glacial acetic acid and 110 parts of acetic anhydride until it is partially dissolved and the mixture is then cooled with stirring at 8° C. A fine suspension is thus obtained, and into this suspension nitrous fumes are passed until formation of the dinitroso compound is complete. This compound is then filtered off and washed with water at 0° C. and dried in vacuum.

Example 2

A mixture of 7 parts of dinitrosodiacetyl-p-phenylenediamine and 200 parts of p-xylene is stirred at 45–50° C. for 12 hours. The resulting liquid is filtered and when nearly all of the excess p-xylene has been removed by distillation the residue is sublimed, or distilled under reduced pressure and yields 2:5:2'':5''-tetramethyl-p-terphenyl, which melts at 113° C. after crystallisation from methyl alcohol.

Example 3

A mixture of 1 part of dinitrosodiacetyl-p-phenylenediamine and 50 parts of p-dichlorobenzene is stirred at 50–55° C. for 10 hours. The residual mixture is diluted with benzene, filtered hot and distilled under reduced pressure. After removal of excess p-dichlorobenzene, 2:5:2'':5''-tetrachloro-p-terphenyl is collected and, after crystallisation from acetic acid, melts at 202–204° C.

Example 4

A mixture of 1 part of dinitrosodiacetyl-p-phenylenediamine and 30 parts of hydroquinone dimethyl ether is stirred at 50–55° C. for 10 hours. The excess dimethyl ether is removed by distillation with steam. Distillation of the residue under reduced pressure gives 2:5:2'':5''-tetramethoxy-p-terphenyl which, after crystallisation from acetic acid, melts at 159–160° C.

Example 5

A mixture of 1 part of 4-nitrosoacetamidodiphenyl (made as described below) and 25 parts of benzene is stirred at 20° C. for 12 hours. After removal of excess benzene by distillation the residue is sublimed under reduced pressure and gives p-terphenyl, M. P. 210° C. 4-nitrosoacetamidodiphenyl is prepared as follows: Nitrous fumes are passed for 5 hours into a solution of 3 parts of 4-acetamidodiphenyl in 50 parts of glacial acetic acid and 10 parts of acetic anhydride at 8° C. The nitroso compound separates in almost quantitative yield on addition of iced water.

*Example 6*

A mixture of 1 part of 2'-nitro-4-nitrosoacetamidodiphenyl (made as described below) and 25 parts of benzene is stirred at 20° C. for 10 hours. After removal of excess benzene by distillation the residue is sublimed under reduced pressure and gives 2-nitro-p-terphenyl, which, after crystallisation from ethyl alcohol, melts at 127–128° C.

2'-nitro-4-nitrosoacetamidodiphenyl is prepared by passing nitrous fumes into a solution of 4 parts of 2'-nitro-4-acetamidodiphenyl in 100 parts of glacial acetic acid and 25 parts of acetic anhydride. It melts at 85–87° C.

*Example 7*

This is the same as Example 6, but using 4'-nitro-4-nitrosoacetamidodiphenyl (M. P. 106° C.). The product, 4-nitro-p-terphenyl, melts at 211–212° C. after crystallisation from ethyl alcohol.

*Example 8*

This is the same as Example 6, but using 3:4'-dinitro-4-nitrosoacetadimodiphenyl. The product 4:3-dinitro-p-terphenyl melts at 174–175° C. after crystallisation from ethyl alcohol.

The nitrosation is carried out at 10–15° C. over a period of 10 hours.

*Example 9*

This is the same as Example 6, using 4'-bromo-4-nitrosoacetamidodiphenyl and benzene at 30° C. The product, 4-bromo-p-terphenyl melts at 231–232° C. after crystallisation from alcohol.

*Example 10*

This is the same as in Example 6 but using 4'-methyl-4-nitrosoacetamidodiphenyl and benzene at 35–40° C. The product, 4-methyl-p-terphenyl, melts at 209–211° C. after crystallisation from glacial acetic acid.

*Example 11*

This is the same as Example 6, but using 2'-methyl-4-nitrosoacetamidodiphenyl and benzene at 20° C. The product, 2-methyl-p-terphenyl, melts at 90–91° C. after crystallisation from ethyl alcohol.

p-Terphenyl and its derivatives which may be obtained by the above mentioned process are suitable starting materials for the manufacture of dyestuffs.

As many apparently widely different embodiments of this invention may be made without departing from the spirit and scope thereof, it is to be understood that the invention is not limited to the specific embodiments thereof except as defined in the appended claims.

We claim:

1. The compound represented by the formula:

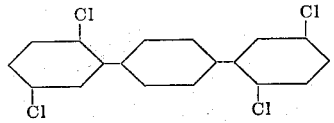

2. The compound represented by the formula:

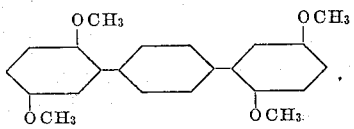

3. The compound represented by the formula:

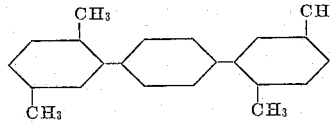

4. The compounds represented by the formula:

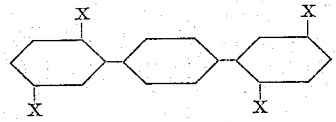

in which each X is one of the class consisting of alkyl, alkoxy, and halogen.

5. The process which comprises reacting dinitroso-diacyl-para-phenylene-diamine with a compound represented by the formula:

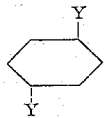

in which the substituents are alike and are from the class consisting of hydrogen, alkyl, alkoxy, and halogen.

6. The process of claim 5 in which the diamine is dinitroso-diacetyl-para-phenylene-diamine.

HAROLD FRANCE.
ISIDOR MORRIS HEILBRON.
DONALD HOLROYDE HEY.